United States Patent
Kjos

[11] Patent Number: 5,860,476
[45] Date of Patent: Jan. 19, 1999

[54] METHOD AND APPARATUS FOR SEPARATING A WELL STREAM

[75] Inventor: Tore Kjos, Oslo, Norway

[73] Assignee: Anil A/S, Hvalstad, Norway

[21] Appl. No.: 619,501

[22] PCT Filed: Sep. 30, 1994

[86] PCT No.: PCT/NO94/00159

§ 371 Date: Mar. 26, 1996

§ 102(e) Date: Mar. 26, 1996

[87] PCT Pub. No.: WO95/09970

PCT Pub. Date: Apr. 13, 1995

[30] Foreign Application Priority Data

Oct. 1, 1993 [NO] Norway ..................................... 933517

[51] Int. Cl.⁶ .................................................. E21B 43/38
[52] U.S. Cl. ........................ 166/265; 166/243; 210/512.2
[58] Field of Search ..................................... 166/265, 243, 166/357; 210/512.2, 170, 788; 95/45, 49, 51

[56] References Cited

U.S. PATENT DOCUMENTS

| | | |
|---|---|---|
| 3,893,918 | 7/1975 | Favret, et al. ........................ 166/265 X |
| 4,296,810 | 10/1981 | Price . |
| 4,344,486 | 8/1982 | Parrish ..................................... 166/272 |
| 4,589,896 | 5/1986 | Chen et al. ........................ 210/640 X |
| 4,659,343 | 4/1987 | Kelly . |
| 4,738,779 | 4/1988 | Carroll et al. ........................ 210/512.2 |
| 4,805,697 | 2/1989 | Fouillout et al. . |
| 5,292,153 | 3/1994 | Peachey .............................. 166/265 X |
| 5,456,837 | 10/1995 | Peachey .............................. 166/265 X |

FOREIGN PATENT DOCUMENTS

| | | |
|---|---|---|
| 0002357 | 1/1981 | European Pat. Off. . |
| 1645478 | 4/1991 | Russian Federation ............... 166/265 |
| 2194572 | 3/1988 | United Kingdom . |

*Primary Examiner*—Hoang C. Dang
*Attorney, Agent, or Firm*—Browdy and Neimark

[57] ABSTRACT

Hydrocarbons are recovered from a sub-surface reservoir whereby a production flow is subjected to a separation process in the well hole. Gas and liquid are separated from each other using a cyclone separator, and condensate/oil is separated from water at high pressure in a subsequent cyclone separation. Membranes are used to separate unwanted gases, includeing $H_2S$, $CO_2$ and $H_2O$, using membranes under high pressure in the well hole.

8 Claims, 4 Drawing Sheets

METHOD AND APPARATUS FOR SEPARATING A WELL STREAM

FIELD OF THE INVENTION

The invention relates to a method of recovering hydrocarbons in a sub-surface reservoir, wherein a production flow is subjected to a separation process in the well hole.

BACKGROUND OF THE INVENTION

To separate oil and water in a well hole is known, for example, from U.S. Pat. No. 4,296,810. The separator used is built up of semi-permeable membranes. The separated water, produced water, is injected into a waste zone above or below the production zone.

U.S. Pat. No. 4,659,343 makes known the separation of carbon dioxide from light hydrocarbons with the aid of a membrane arrangement. During the separation through the semipermeable membrane, a condensate emerges (hydrocarbons in liquid form) in contact with the membrane. These (liquified) liquid hydrocarbons are separated from the gases which do not pass through the membrane. This separation takes place by means of conventional membrane technology used in traditional processes within the processing industry.

Gravitation separation of hydrocarbons and water in a well hole is known, for example, from U.S. Pat. No. 4,766,957. The produced water flows into a waste zone and the oil passes upward to the surface.

U.S. Pat. No. 4,805,697 describes the reinjection of produced water, resulting from the separation of hydrocarbons and water in a centrifugal separator, of the dynamic or static type, regulated as a function of the hydrocarbon content in the produced water.

Hollow fiber separation (the hollow fibers are of a semi-permeable membrane material) is discussed in U.S. Pat. No. 5,176,725.

NO B 173426 describes the use of cyclone separators in the separation of oil and water in a well hole.

The processing of a production flow in a well hole gives rise to great advantages, especially by virtue of the fact that one does not need to lift, separate or remove the produced water.

SUMMARY OF THE INVENTION

The objective of the present invention is to provide, in the hole, a process which makes possible the supply of gas free of unwanted gases at the surface, with the possibility of reinjecting produced water and the separated, unwanted gases into a waste zone, so that one avoids cost-intensive lifting etc, of the unwanted parts of the production flow and avoids having to conduct these unwanted parts back into the reservoir through special reinjection/waste wells or dumping into the sea or the atmosphere.

According to the invention, it is proposed to carry out a cyclone separation of gas and liquid with a subsequent cyclone separation of condensate/oil from water at high pressure in the well hole, as well as a separation of the gas phase's unwanted gases, $H_2S$, $CO_2$ and $H_2O$, by using membranes under high pressure in the well hole.

The separated gases may to advantage be dissolved in a liquid, preferably sea water, prior to reinjection into a waste zone, a reinjection zone or to a recipient.

Such highly pressurised sea water in a well/reservoir can dissolve large quantities of gas. The reject from the membrane may therefore contain small amounts of gas together with $H_2S$, $CO_2$, which it is not economical to separate further and which again may be dissolved in sea water through a chamber which mixes gas and sea water and dissolves the residual gases for further injection into a waste reservoir or for further dilution and emission to a recipient.

The invention relates also to an arrangement for use for recovering hydrocarbons in a sub-surface reservoir, comprising cyclone separators inside a well hole. The arrangement is characterised in that it comprises a cyclone separator for separating gas and liquid and a cyclone separator for separating condensate/oil from water at high pressure in a well hole, and a membrane arrangement for the separation of the gas phase's unwanted gases, $H_2S$, $CO_2$ and $H_2O$, at high pressure in a well hole. The cyclone separators and the membrane arrangement may advantageously be placed in a pipe string, which may be a permanent part of a production string or a free-standing part which can be lifted by known means.

The invention relates also to an arrangement of processing elements of a particularly weight and space-saving nature which may be used on an existing wellhead platform, where the arrangement/string is a part of the riser, or a separate pipe along one of the girders etc, or as an integrated part of a floating vessel/loading buoy.

Several cyclone separators and/or membrane arrangements may be connected in series relation.

One advantage that is achieved by means of the invention is the supply of a gas and a condensate as finished products ready to flow directly from the well to transport pipelines and consumers. One avoids process platforms and investments running into billions and thus emissions of $CO_2$ into the air, and consequently $CO_2$ taxes. There is a reduction in requirements to be met by materials (after $CO_2$ removal) in the well/seabed installation and the, transport pipeline. It will be unnecessary to add glycol/methanol in the transport pipeline, and one avoids a methanol/glycol recovery plant or purification plant. Furthermore, one will avoid the formation of hydrates in the transport pipelines. The reinjection of an uneconomical gas portion into the membrane reject may be permitted, as the gas does not pass into the atmosphere.

BRIEF DESCRIPTION OF THE DRAWINGS

The invention shall now be described in detail with reference to the drawings where.

Figures 1, 1A:
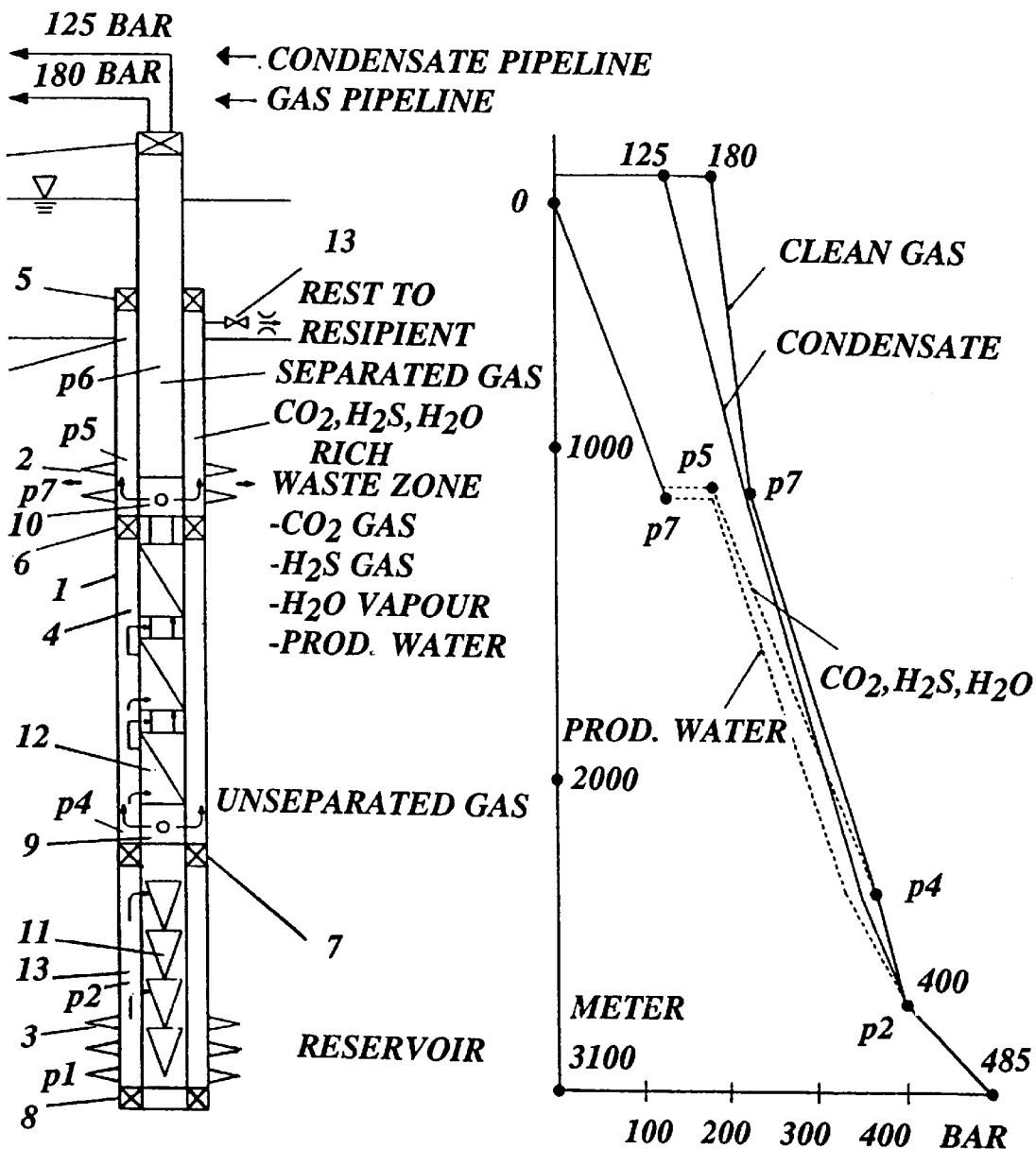
FIG. 1 is a schematic outline of a well hole with an arrangement according to the invention, with appurtenant pressure diagram.

The well hole 1 shown in outline in FIG. 1 passes through a waste zone 2 and a production zone 3. A production string 4 is located in the well hole and is sealed in the well hole 1 by means of suitable packers 5–8. A lower packer 8 and a lower intermediate packer 7 demarcate the production zone, while an upper intermediate packer 6 and an upper packer 5 demarcate the waste zone. A distribution valve 9 is provided above the lower intermediate packer 7, while a distribution valve 10 is located above the upper intermediate packer 6.

A plurality of cyclone generators 11 are located in the production string 1, between the lower packer 8 and the lower intermediate packer 7, while a plurality of membrane arrangements 12 are located in the production string 1, between the two intermediate packers 6 and 7.

Gas and liquid flow from the reservoir (production zone 3) to the annulus 13 and to the cyclone separators 11, as indicated by means of the arrows. Separated gas and liquid pass from the cyclone separators upward in the production string and the well hole respectively. The process will be explained in detail with reference to FIG. 2 and FIGS. 3 to 5.

The production flow 3 passes from the gas/condensate reservoir 3 to the cyclone separators 11a. Gas passes as top reject to the distribution valve 9 and thence to the membrane arrangement 12 where unwanted gases $H_2S$, $CO_2$ and $H_2O$ are separated, while dry, clean gas continues upward to the surface. The bottom reject from the cyclone separators, which is condensate and water in a mixture, flows to the cyclone separators 11b, whence condensate passes as top reject and produced water passes as bottom reject. The condensate is conducted to the surface. The separated, unwanted gases and produced water pass to the recipient 13 and/or to a pump 14 for reinjection into the waste zone 2. In the process diagram in FIG. 2, an alternative reinjection pump 15 has been drawn in a waste zone below the production zone. The pump 14 (and 15) is operated by a hydraulic medium, which may be sea water in the well hole which, in this case, is presumed to be an offshore well hole. The sea water may to advantage, also as shown, be used in a cooler 16 for the gas.

Figure 4:
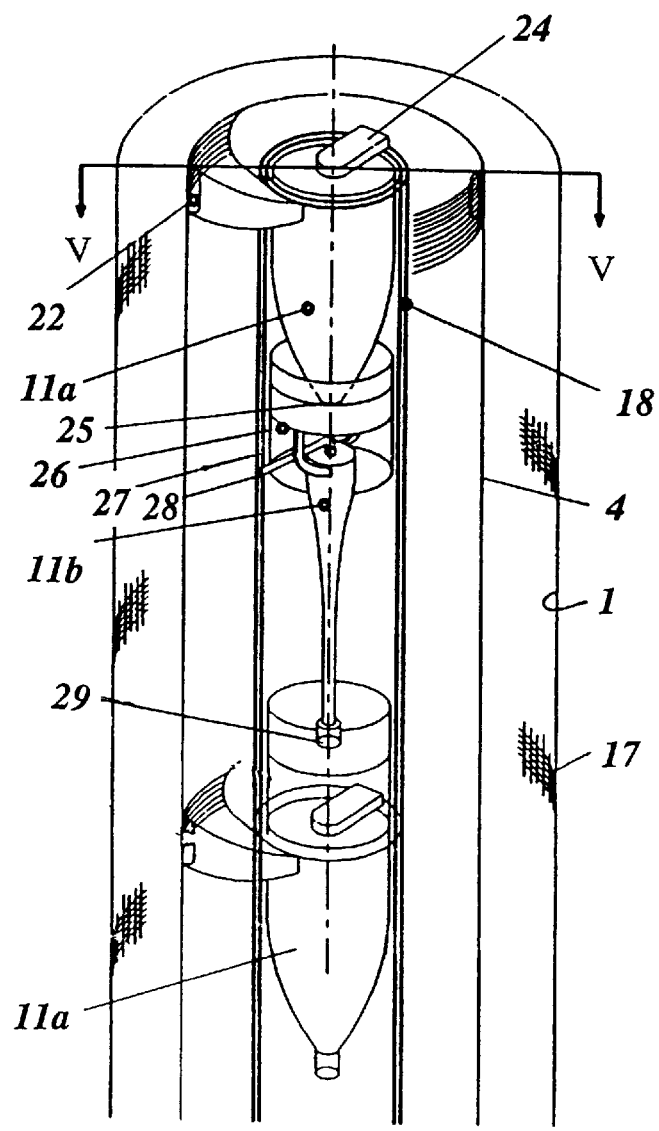
FIG. 4 illustrates a cyclone separator for separating gas/condensate/water.
Figure 5:
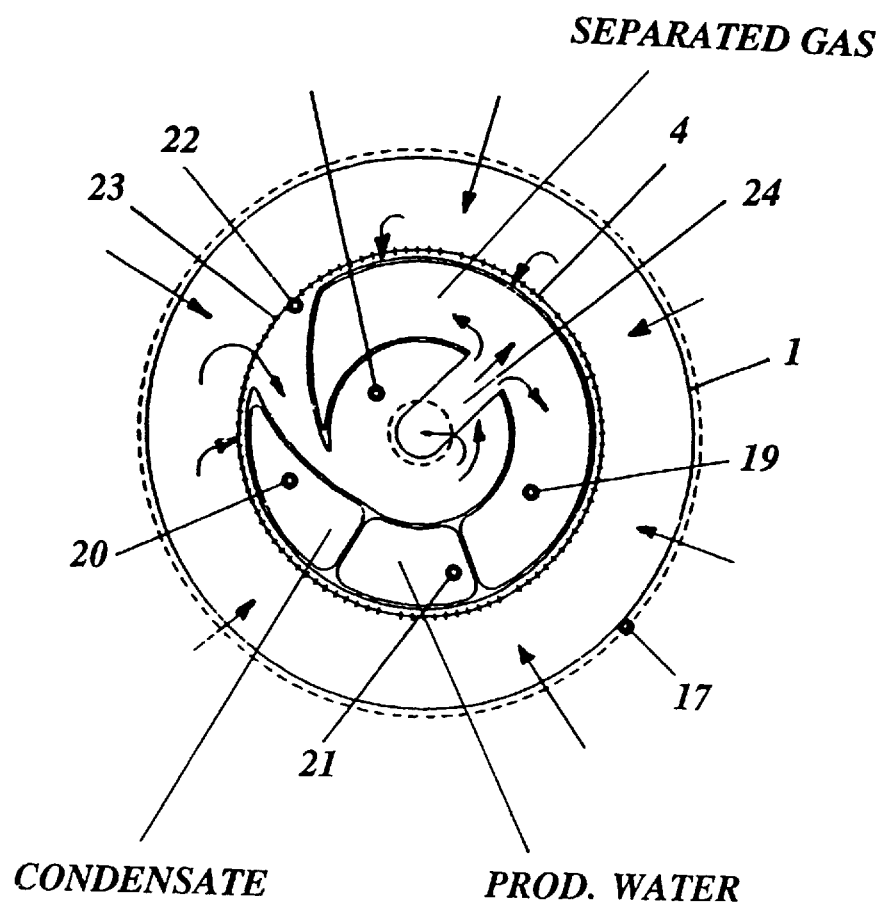
FIG. 5 is a horizontal section along line A—A in FIG. 4

FIGS. 4 and 5 show an example of a cyclone separator unit which may be used on the implementation of the method according to the invention. Here, as in FIG. 1, the well hole is indicated by means of the reference numeral 1, and comprises a perforated wall 17. The production pipe, as in FIG. 1, is indicated by means of the reference numeral 4.

The cyclone separators 11a,b are located centrally in a pipe element 18. Therearound are located sectioned ducts 19, 20 and 21 for the separated gas, condensate 20 and produced water 21 respectively (FIG. 5). The inlet to the cyclone separator 11a, which is a gas/water separator, is indicated by means of the reference numeral 22 and is covered by a grill 23. The cyclone separator 11a has a top outlet 24 for separated gas and opens into the gas duct 19. The bottom outlet 25 of the cyclone separator 11a passes via a distribution section 26 to the cyclone separator 11b through pipeline 27 (FIG. 4). The cyclone separator 11bis a condensate/water separator. The top reject, condensate, flows through the pipeline 28 to the condensate duct 20, whilst the bottom reject, produced water, flows to the duct 21 at 29.

Figure 2:
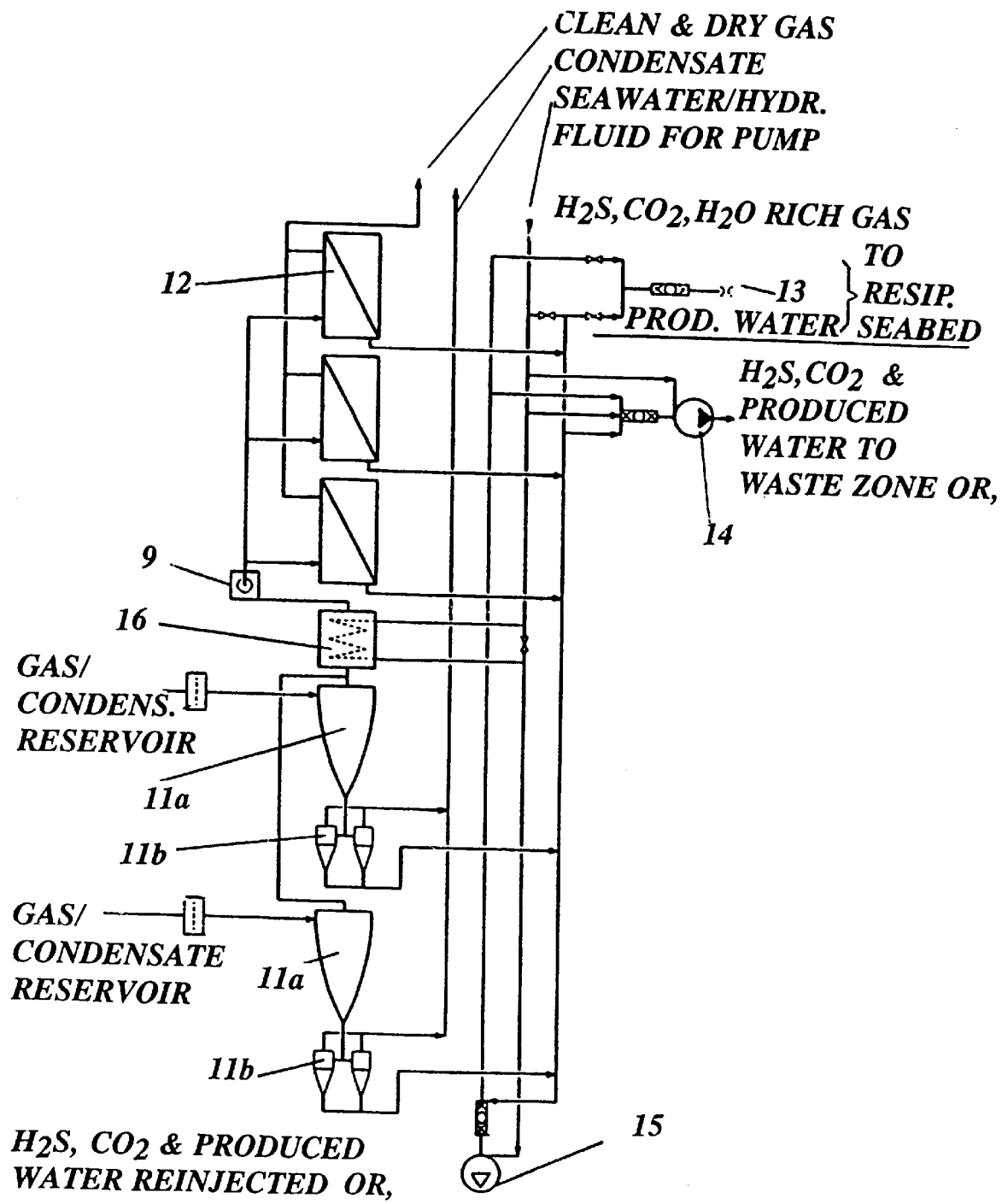
FIG. 2 is a process diagram for the invention.

In FIG. 4, yet another cyclone separator 11a is indicated (at the bottom in the figure), to show that several cyclone separator units, as described, may be provided one after the other in the pipe element or pipe string 18, in parallel operation, as in FIG. 2.

Figure 3:
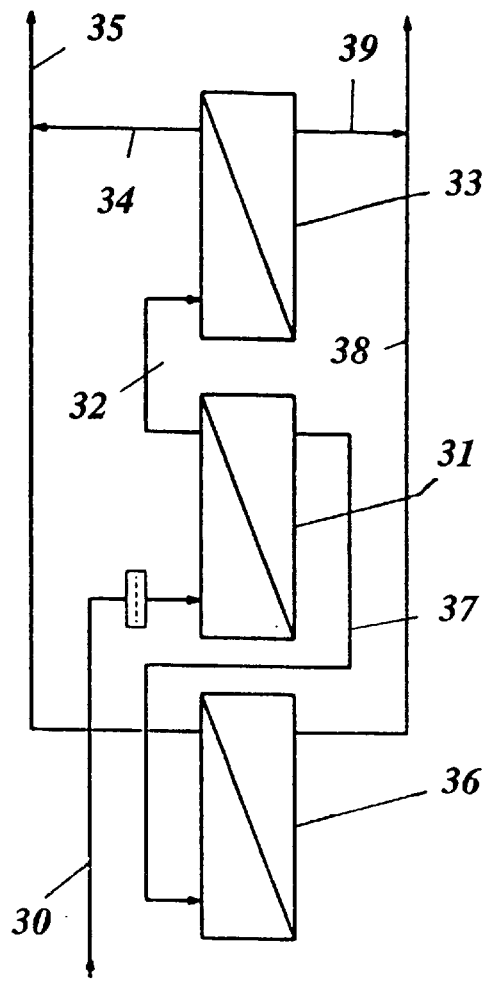
FIG. 3 illustrates a multi-step membrane arrangement.

FIG. 3 shows an example of a multi-step membrane arrangement which may be used on the implementation of the invention, i.e., for the part which relates to membrane separation of unwanted gases, disclosed herein as $H_2S$, $CO_2$ and $H_2O$.

Untreated, separated gas from the cyclone separators (11a in FIG. 4) flows through the pipeline 30 to a first membrane 31. Thence the purified gas flows through the pipeline 32 to a second membrane 33 for further purification/separation. Clean gas is withdrawn through the pipeline 34 and passes to the pipeline 35, which conducts purified gas from a third membrane 36. This membrane separates gas from the $CO_2$, $H_2S$, $H_2O$ enriched gas from the membrane 31. The enriched gas portion including unwanted gases is conducted as shown from the first membrane 31 to the third membrane 36 through a pipeline 37. Clean gas passes from the third membrane 36 to the pipeline 35 and $H_2S$, $CO_2$, $H_2O$ rich gas passes to the pipeline 38, to which separated gas from the second membrane 33 is also conducted through the pipeline 39.

I claim:

1. A method for recovering hydrocarbons in a subsurface reservoir comprising:

providing a production flow in a wellbore, locating a first and second cyclone separator in series in said wellbore, locating a membrane assembly in said wellbore, said first cyclone separator having an inlet, a gas outlet and a liquid outlet, said second cyclone separator having an inlet in flow communication with said liquid outlet of said first cyclone separator and having a condensate/oil phase outlet and a liquid phase outlet, said gas outlet of said first cyclone separator being in flow communication with an inlet side of said membrane assembly;

allowing the production flow to flow into the inlet of said first cyclone separator and separating said production flow therein in a gas flow and a liquid flow;

allowing said liquid flow to flow out through said liquid outlet and into the inlet of said second cyclone separator;

separating the liquid flow into a condensate-oil phase and a water phase in said second cyclone separator;

allowing the gas flow to enter the inlet side of said membrane assembly and separating unwanted gases from said gas flow in the membrane assembly.

2. A method according to claim 1, wherein the unwanted gases are selected from the group consisting of $H_2S$, $CO_2$, and mixtures thereof.

3. A method according to claim 1, wherein the separated unwanted gases are reinjected into a waste zone or into a reinjection zone.

4. A method according to claim 1, wherein the separated unwanted gases are dissolved in a liquid and then are reinjected into a waste zone or into a reinjection zone.

5. A method according to claim 1, wherein the separated unwanted gases are dissolved in seawater and then are reinjected into a waste zone or into a reinjection zone.

6. Apparatus for use in the recovery of hydrocarbons from a sub-surface reservoir comprising:

a first cyclone separator having an inlet, a gas outlet, and a liquid outlet;

a second cyclone separator having an inlet in flow connection with said liquid outlet of said first cyclone separator, an outlet for a lighter liquid phase and an outlet for a heavier liquid phase;

a membrane assembly having an inlet side, said gas outlet being in flow connection with said inlet side of said membrane assembly, wherein said membrane is adapted to separated gases; and wherein said first and said second cyclone separators and said membrane assembly are incorporated in a string adapted for insertion into a wellbore.

7. Apparatus for use in the recovery of hydrocarbons from a sub-surface reservoir comprising:

a first cyclone separator having an inlet, a gas outlet, and a liquid outlet;

a second cyclone separator having an inlet in flow connection with said liquid outlet of said first cyclone separator, an outlet for a lighter liquid phase and an outlet for a heavier liquid phase;

a membrane assembly having an inlet side, said gas outlet being in flow connection with said inlet side of said membrane assembly, wherein said membrane is adapted to separated gases; and wherein said first and second cyclone separators and said membrane assembly are incorporated in a string adapted for insertion into a riser extending to a floating platform from a wellbore.

8. Apparatus for use in the recovery of hydrocarbons from a sub-surface reservoir comprising:

a first cyclone separator having an inlet, a gas outlet, and a liquid outlet;

a second cyclone separator having an inlet in flow connection with said liquid outlet of said first cyclone separator, an outlet for a lighter liquid phase and an outlet for a heavier liquid phase;

a membrane assembly having an inlet side, said gas outlet being in flow connection with said inlet side of said membrane assembly, wherein said membrane is adapted to separated gases; and said apparatus is provided in the form of a string in a dummy well, and a casing is deposited as a well element on the seabed and as part of a seabed installation.

\* \* \* \* \*